(12) United States Patent
Ota et al.

(10) Patent No.: US 7,991,299 B2
(45) Date of Patent: Aug. 2, 2011

(54) OPTICAL TRANSMITTER WITH DRIVING VOLTAGE CONTROL AND METHOD

(75) Inventors: Morihiko Ota, Tokyo (JP); Tadashi Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 690 days.

(21) Appl. No.: 11/964,475

(22) Filed: Dec. 26, 2007

(65) Prior Publication Data

US 2008/0212979 A1 Sep. 4, 2008

(30) Foreign Application Priority Data

Dec. 26, 2006 (JP) ................................ 2006-349080

(51) Int. Cl.
*H04B 10/04* (2006.01)
(52) U.S. Cl. ........................................ 398/198; 398/197
(58) Field of Classification Search ............ 398/196–198
See application file for complete search history.

(56) References Cited

U.S. PATENT DOCUMENTS

| | | | | |
|---|---|---|---|---|
| 7,197,252 | B2 * | 3/2007 | Oomori | 398/193 |
| 2004/0161249 | A1 * | 8/2004 | Suda et al. | 398/198 |
| 2006/0133827 | A1 * | 6/2006 | Becouarn et al. | 398/213 |

FOREIGN PATENT DOCUMENTS

| | | | |
|---|---|---|---|
| JP | 2004-126024 | * | 4/2004 |
| JP | 2004126024 A | | 4/2004 |

* cited by examiner

*Primary Examiner* — Nathan M Curs

(57) ABSTRACT

An exemplary aspect of the invention is an optical transmitter that emits a light signal, including: a light source; a Mach-Zehnder optical modulator; a modulator driver; a wavelength information holder; and a driving voltage controller, wherein the Mach-Zehnder optical modulator modulates the light intensity of output light from the light source by use of a modulator driving signal, the modulator driver outputs the modulator driving signal according to an input data signal, the wavelength information holder holds wavelength information on the output light of the light source, the driving voltage controller outputs, to the modulator driver, a control signal for setting the latest driving voltage, according to the wavelength information from the wavelength information holder.

3 Claims, 5 Drawing Sheets

OPTICAL TRANSMITTER WITH DRIVING VOLTAGE CONTROL AND METHOD

This application is based upon and claims the benefit of priority from Japanese Patent Application No. 2006-349080 filed on Dec. 26, 2006 the content of which is incorporated by reference.

BACKGROUND OF THE INVENTION

1. Field of the Invention

The present invention relates to an optical transmitter and an optical transmission control method used for optical transmission, and particularly relates to an optical transmitter and an optical transmission control method used in a wavelength division multiplexing optical transmission system.

2. Description of the Related Art

In optical transmission systems that transmit a large capacity of data at a high bit rate by using an optical fiber as a transmission medium, the transmission capacity has been enlarged more and more by employing wavelength division multiplexing (WDM) in recent years. Optical transmitters in such optical transmission systems employ external modulation systems that enable long distance transmission while keeping wavelength variations small. Among them, a Mach-Zehnder optical modulator is an often-used optical modulator.

FIG. 7 shows a configuration of an optical transmitter using a conventional Mach-Zehnder optical modulator. This optical transmitter includes a wavelength variable light source unit 301, a Mach-Zehnder optical modulator 302 and a modulator driver 303.

Among them, the modulator driver 303 converts an input data signal S into a driving signal SD at a driving voltage needed for the Mach-Zehnder optical modulator 302. The Mach-Zehnder optical modulator 302 modulates light L by changing its light intensity by use of the driving signal SD, and outputs a light signal Lm. Here, the light L is inputted from the wavelength variable light source unit 301.

A dependency of light output on the driving voltage in the Mach-Zehnder optical modulator 302 is expressed as a sinusoidal function of the driving voltage (the horizontal axis) relative to the output light intensity level (the vertical axis) as shown in FIG. 8A. A difference between the driving voltages that take the maximum and minimum values of the output light intensity level is referred to as a $V\pi$ voltage. The $V\pi$ voltage indicates a driving signal voltage that corresponds to an extinction ratio.

Here, the extinction ratio of the light modulator is a ratio between the maximum transmitted light intensity to the minimum transmitted light intensity. The larger this ratio, the higher the performance of the light modulator. In the case where the light source unit 301 outputs light of only one wavelength, the Mach-Zehnder optical modulator 302 easily sets the amplitude voltage of the driving signal SD to the $V\pi$ voltage such that the extinction ratio can be maximized in FIG. 8A.

Recently, however, a wavelength variable light source covering the C band (1530 to 1565 nm) and the L band (1565~1610 nm) has been developed. Thus, one optical transmitter has been made capable of outputting light of wavelengths in the C band and the L band. For this reason, the wavelength dependence of the $V\pi$ voltage in the Mach-Zehnder optical modulator has become problematic.

FIG. 8B shows the wavelength dependences of the $V\pi$ voltages and variations in light output waveforms under the conditions of two wavelengths $\lambda 1$ and $\lambda 2$ in the Mach-Zehnder optical modulator. From FIG. 8B, it is understandable that the Mach-Zehnder optical modulator has a modulation characteristic ($V\pi$ voltage) that changes with a change in the wavelength. In this case, even though the driving voltage is set to the optimum value under the condition of a certain constant wavelength, the extinction ratio is deteriorated due to the wavelength dependence of the $V\pi$ voltage when light of a different wavelength is inputted. Moreover, this also leads to a problem of deteriorating the optical transmission waveform due to turns of the optical transmission waveform at the high level and the low level.

As one of methods for solving these problems, a controller has been provided which obtains, for example, information on changes in light wavelength somehow, and controls a modulator driver so that the modulator driver can output the $V\pi$ voltage corresponding to the obtained wavelength information (Japanese Patent Laid-open Application Publication No. 2004-126024).

However, any method for obtaining light information requires an actual wavelength detector except for a method of estimating the light information from the driving voltage of the wavelength variable light source unit. In addition, a correspondence between the wavelength and the $V\pi$ voltage is determined according to a table including the correspondence stored in advance, and accordingly the modulator driver cannot always be controlled optimally under an actual environment.

As described above, the wavelength dependence of the $V\pi$ voltage of the Mach-Zehnder optical modulator had become a serious problem with the widening of bandwidth of a wavelength variable light source. Accordingly, when the light modulator is driven at a constant driving amplitude, light of a certain transmission wavelength may cause a problem of deteriorating the waveform and the extinction ratio of the light signal, and thereby deteriorating transmission quality.

SUMMARY

An exemplary object of the invention is to provide an optical transmitter and an optical transmission control method that are capable of maintaining the quality of a light transmission waveform even when the wavelength of a wavelength variable light source is changed.

An exemplary aspect of the invention is an optical transmitter that emits a light signal, including: a light source; a Mach-Zehnder optical modulator; a modulator driver; a wavelength information holder; and a driving voltage controller, wherein the Mach-Zehnder optical modulator modulates the light intensity of output light from the light source by use of a modulator driving signal, the modulator driver outputs the modulator driving signal according to an input data signal, the wavelength information holder holds wavelength information on the output light of the light source, the driving voltage controller outputs, to the modulator driver, a control signal for setting the latest driving voltage, according to the wavelength information from the wavelength information holder.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

1. First Exemplary Embodiment

Figure 1:
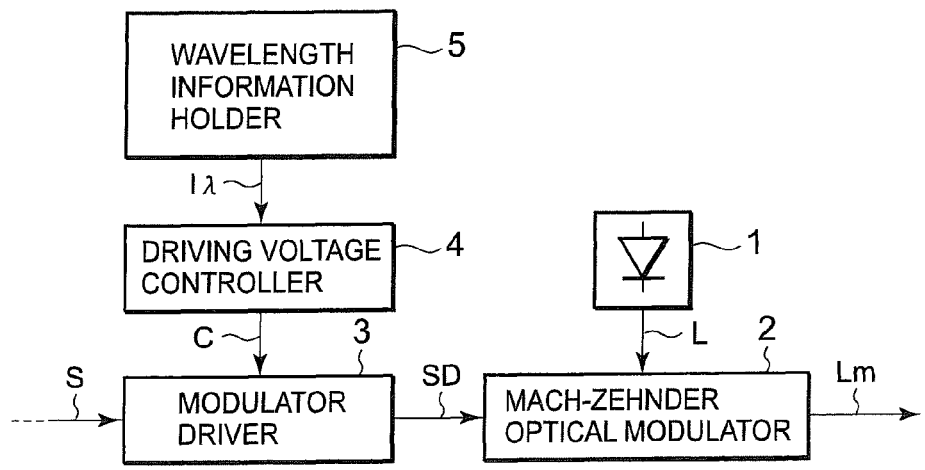
FIG. 1 is a block diagram showing an optical transmitter according to a first exemplary embodiment.

Hereinafter, a first exemplary embodiment of the present invention will be described by referring to FIGS. 1 to 3. As shown in FIG. 1, an optical transmitter according to this exemplary embodiment includes a wavelength variable light source unit 1, a Mach-Zehnder optical modulator 2 and a modulator driver 3. By use of a modulator driving signal SD, the Mach-Zehnder optical modulator 2 modulates the light intensity of output light from the wavelength variable light source unit 1. The modulator driver 3 outputs the modulator driving signal SD according to an input data signal S.

This optical transmitter further includes a wavelength information holder and a driving voltage controller 4. The wavelength information holder holds the wavelength information of output light from the wavelength variable light source unit 1. The driving voltage controller 4 outputs a control signal from the wavelength information holder to the modulator driver 3. The control signal is for setting the latest driving voltage, and is based on the wavelength information. Here, precisely, the wavelength information holder 5 may be configured of a wavelength division multiplexing (WDM) transmission device that monitors and controls the entire system. The WDM transmission device may represent a monitor/controller in the WDM transmission device.

The wavelength variable light source unit 1 emits light L having a variable wavelength. The Mach-Zehnder optical modulator 2 modulates the light intensity of the input light L by use of the driving signal SD, and outputs a light signal Lm. The modulator driver 3 has a function of converting an input data signal S into the modulator driving signal SD according to the control signal C from the driving voltage controller 4.

These three components implement a function of modulating the light L from wavelength variable light source unit 1 by use of the input data signal S, and of transmitting the light signal Lm of the light with the modulated intensity. The driving voltage controller 4 has a function of controlling the modulator driving signal SD outputted from the modulator driver 3 so that the modulator driving signal SD can be the optimum driving voltage Vπ according to the wavelength of the light L. More precisely, upon obtaining the information on the light wavelength, the driving voltage controller 4 generates the control signal C corresponding to the obtained information, and then transmits the control signal C to the modulator driver 3.

The wavelength information holder 5 usually holds information on the emitted light wavelength, and thereby transmits wavelength information Iλ to the driving voltage controller 4.

Figure 2:
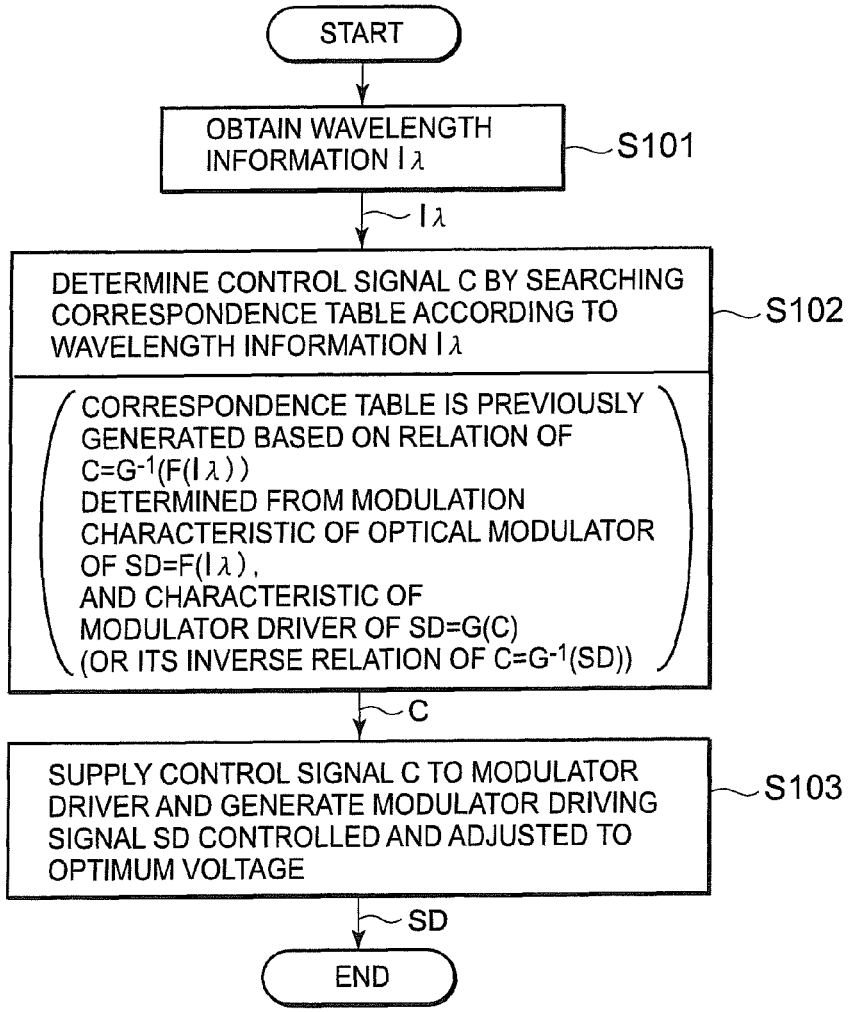
FIG. 2 is an explanatory diagram showing a control operation flow according to the first exemplary embodiment.

Next, by using FIG. 2, description will be provided for an operational flow of controlling the driving signal SD to be transmitted to the Mach-Zehnder optical modulator 2.

First, the driving voltage controller 4 obtains the wavelength information Iλ of the wavelength variable light source unit 1 (step S101: a wavelength information obtaining step). As the obtaining method, the wavelength information holder 5 may determine the wavelength information Iλ to be needed, and transmit the information to the driving voltage controller 4. Instead, the driving voltage controller 4 may be configured to obtain the information by transmitting, to the wavelength information holder 5, a command signal requesting the wavelength information Iλ.

Thereafter, the driving voltage controller 4 generates the control signal C according to the obtained wavelength information Iλ (step S102: a control signal generation step). More specifically, the driving voltage controller 4 stores a previously-generated correspondence table between the wavelength information Iλ and the control signal C in a memory, and generates the control signal C by referring to the correspondence table.

This correspondence table between the wavelength information Iλ and the control signal C is generated based on the following two relations.

Figure 3A:
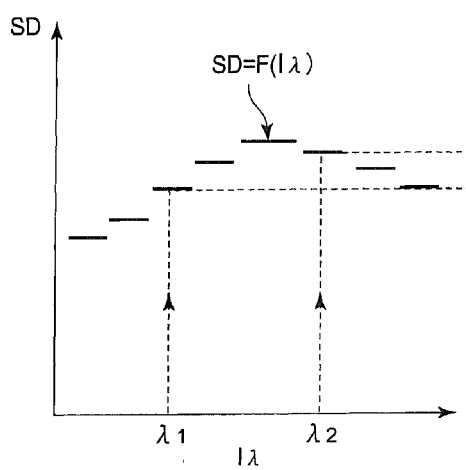
FIG. 3A and FIG. 3B is an explanatory diagram showing a process of generating a correspondence table between a control signal and wavelength information according to the first exemplary embodiment.
Figure 3B:
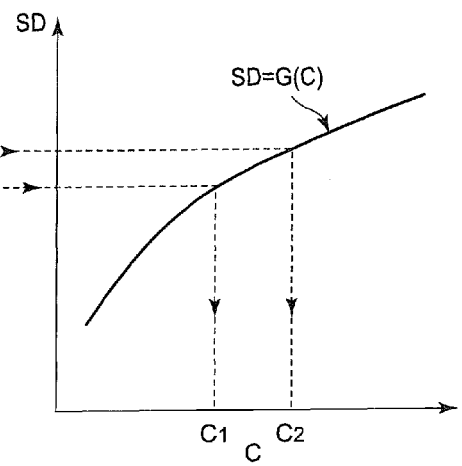

One of the relations is a modulation characteristic of the Mach-Zehnder optical modulator 2, as shown in FIG. 3A, (a relational expression of the wavelength information Iλ and the optimum Vπ voltage of the driving signal SD):

$$SD=F(I\lambda) \quad (1)$$

and the other one is a control characteristic of the modulator driver 3, as shown in FIG. 3B, (a relational expression of the control signal C and the modulator driving signal SD):

$$SD=G(C) \quad (2A),$$

or its inverse relation:

$$C=G-1(SD) \quad (2B).$$

The correspondence table between the control signal C and the wavelength information Iλ is generated with a relational expression:

$$C=G-1(F(I\lambda)) \quad (3)$$

that is determined by the above two relational expressions "the equation (2B) and the equation (1)."

To be more precise, the driving voltage controller 4 may hold and search the correspondence table between the wavelength information Iλ and the control signal C, or may prepare the respective correspondence tables for the above two relational expressions "the equation (1) and the equation (2B)" and generate the control signal C by performing two searches in the two tables.

The modulator driver 3 controls the voltage of the modulator driving signal SD according to the applied control signal so that the voltage can be optimum (step S103: a driving signal voltage controlling step). In other words, the voltage of the modulator driving signal SD is determined according to the control signal C with the equation (2A) that represents a characteristic of the modulator driver.

Since the control signal C is determined by use of the relation of the equation (3) "C=G−1(F(Iλ))" in the driving voltage controller 4, the modulator driving signal SD has a relation: SD=G[G−1(F(Iλ))]=F(Iλ). In other words, (the voltage of) the modulator driving signal SD satisfies the equation (1) "SD=F (Iλ)" that is the aforementioned relational expression of the wavelength information Iλ and the optimum Vπ voltage of the modulator driving signal SD. Accordingly, the voltage surely meets the equation (1) that is the aforementioned relational expression of the wavelength information Iλ and the optimum Vπ voltage of the modulator driving signal SD. Thus, it is confirmed that the purpose of the control is achieved.

In the foregoing way, even when the light wavelength of light from the wavelength variable light source 1 is changed, the driving voltage controller 4 generates the control signal C appropriate for the changed light wavelength. Then, according to the control signal C, the modulator driver 3 generates the modulator driving signal SD for the optimum Vπ voltage. Thus, the Mach-Zehnder optical modulator 2 is capable of transmitting the light signal Lm having a high extinction ratio.

The optical transmitter of this exemplary embodiment having the above configuration and operation is capable of checking the influence of variation in the Vπ voltage which the Mach-Zehnder optical modulator causes due to the wavelength variation, and thereby produces an effect of keeping constant quality of the light transmission waveform such as the extinction ratio.

The foregoing steps in the control operational flow executed by the above components may be executed by a computer. In this case, a program is created by regarding the execution contents of the steps as a wavelength information obtaining function, a control signal generating function and a driving signal voltage controlling function, and then the program thus created is executed by the computer.

In this way, the processing having the same processing contents as the above steps can be executed by the computer, and thereby the same object as in the case of the optical transmission control method can be achieved efficiently.

2. Second Exemplary Embodiment

Figure 4:
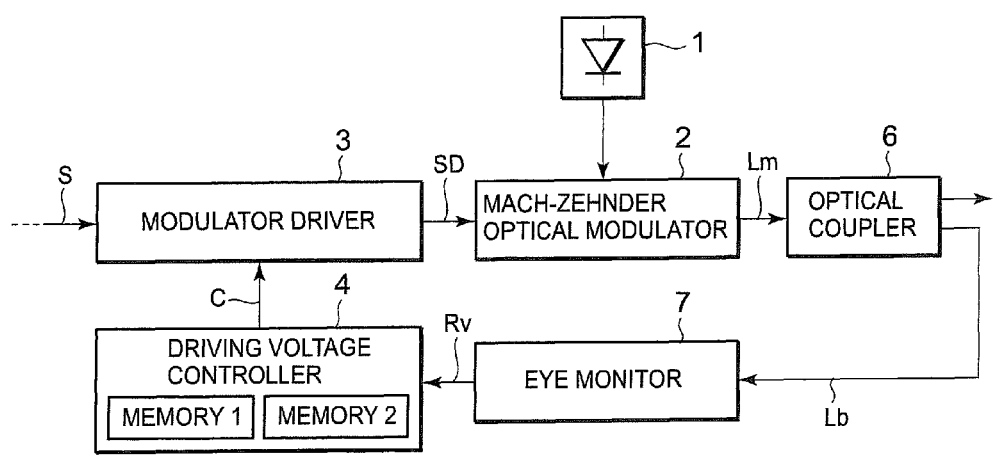
FIG. 4 is a block diagram of an optical transmitter according to a second exemplary embodiment.

Hereinafter, a second exemplary embodiment will be described by referring to FIGS. 4 to 6. As shown in FIG. 4, an optical transmitter in the second exemplary embodiment includes a wavelength variable light source unit 1, a Mach-Zehnder optical modulator 2 and a modulator driver 3. The Mach-Zehnder optical modulator 2 modulates the light intensity of output light from the wavelength variable light source unit 1 by use of a modulator driving signal SD. The modulator driver 3 outputs the modulator driving signal SD according to an input data signal.

In addition, this also includes an optical coupler 6, an eye monitor 7 and a driving voltage controller 4. The optical coupler 6 splits modulated light from the Mach-Zehnder optical modulator 2. Moreover, the optical coupler 6 has a function of forming "a control feedback" for optimally controlling modulation conditions of the Mach-Zehnder optical modulator 2. The eye monitor 7 calculates an extinction ratio Rv of the split modulated light. To the modulator driver 3, the driving voltage controller 4 outputs a control signal for setting the latest driving voltage.

Figure 5:
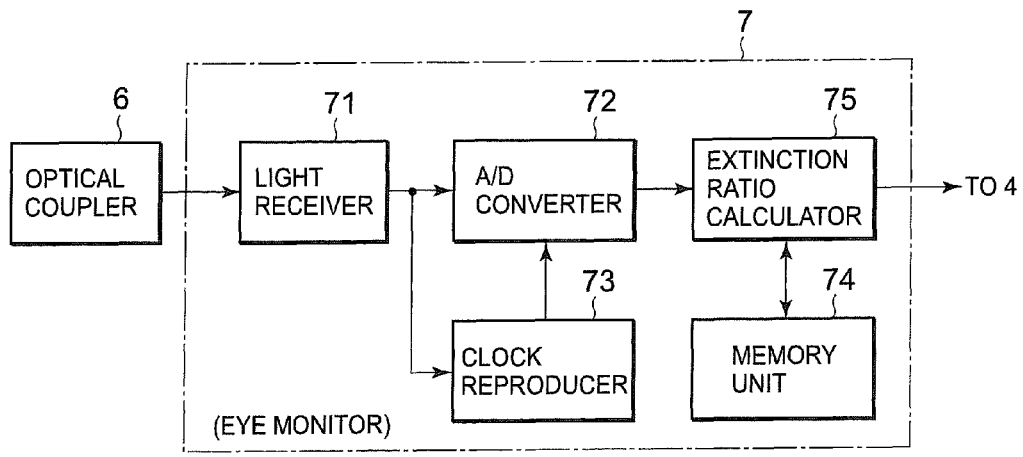
FIG. 5 is a block diagram showing a configuration of an eye monitor according to the second exemplary embodiment.

Here, as shown in FIG. 5, the eye monitor 7 includes a light receiver 71, a clock reproducer 73, an A/D converter 72 and an extinction ratio calculator 75. The light receiver 71 converts the modulated light into an electric signal, and the clock reproducer 73 reproduces a clock signal from the electric signal. The A/D converter 72 converts the electric analog signal into a digital signal according to the clock signal. The extinction ratio calculator 75 calculates the extinction ratio Rv based on the digital signal.

The optical coupler 6 splits the light signal Lm into 2 light beams, and then transmits one of the light beams, light Ls, to a transmission path while transmitting the other one of the light beams, light signal Lb, to the eye monitor 7. On the basis of the light signal Lb, which is one of the split light beams, the eye monitor 7 calculates the extinction ratio Rv representing the modulation conditions of the Mach-Zehnder optical modulator 2.

The driving voltage controller 4 includes a memory 1 for storing the current extinction ratio Rv and the prior extinction ratio Rv at a certain preceding time, and a memory 2 for storing a direction of increase or decrease in the control signal C. The driving voltage controller 4 determines a correction amount ΔC of the control signal C by using these memory 1 and memory 2 according to a difference ΔRv between these extinction ratios Rv, determines the sign according to the direction of increase or decrease of the control signal C, and then generates a new control signal "C=C±ΔC." More detailed description will be provided below together with description for an operational flow.

The modulator driver 3 generates the modulator driving signal SD having a voltage optimally controlled according to this control signal C. The description for the other components same as or corresponding to those in the first exemplary embodiment are omitted here, since the same reference numerals are given to the components in FIG. 4.

Here, the eye monitor 7 will be described in detail.

This eye monitor 7 includes the light receiver 71, the A/D converter 72, the clock reproducer 73, a memory unit 74 and the extinction ratio calculator 75. The light receiver 71 converts the light signal Lb from the optical coupler 6 into the electric signal. The A/D converter 72 converts the analog electric signal into the digital signal. The clock reproducer 73 determines a time point around the center of the eye pattern that is needed to calculate the extinction ratio. The memory unit 74 stores ON values and OFF values of the eye pattern at the clock time point.

The extinction ratio calculator 75 stores both ON and OFF values corresponding to ON and OFF pulses in the memory unit 74, until at least the two values are transmitted from the A/D converter 72. Then, the extinction ratio calculator 75 calculates the extinction ratio Rv upon obtaining all the values needed to calculate the extinction ratio, and transmits the extinction ratio Rv to the driving voltage controller 4.

Hereinafter, operations of the second exemplary embodiment will be described.

First, wavelength variable light L is generated by the wavelength variable light source unit 1, and inputted to the Mach-Zehnder optical modulator 2. The modulator driver 3 converts the input data signal S into the modulator driving signal SD having the optimum driving voltage Vπ, and then inputs the modulator driving signal SD into the Mach-Zehnder optical modulator 2. The Mach-Zehnder optical modulator 2 modulates the intensity of the light L, and outputs the light L as the light signal Lm having the light intensity modulated.

Figure 6:
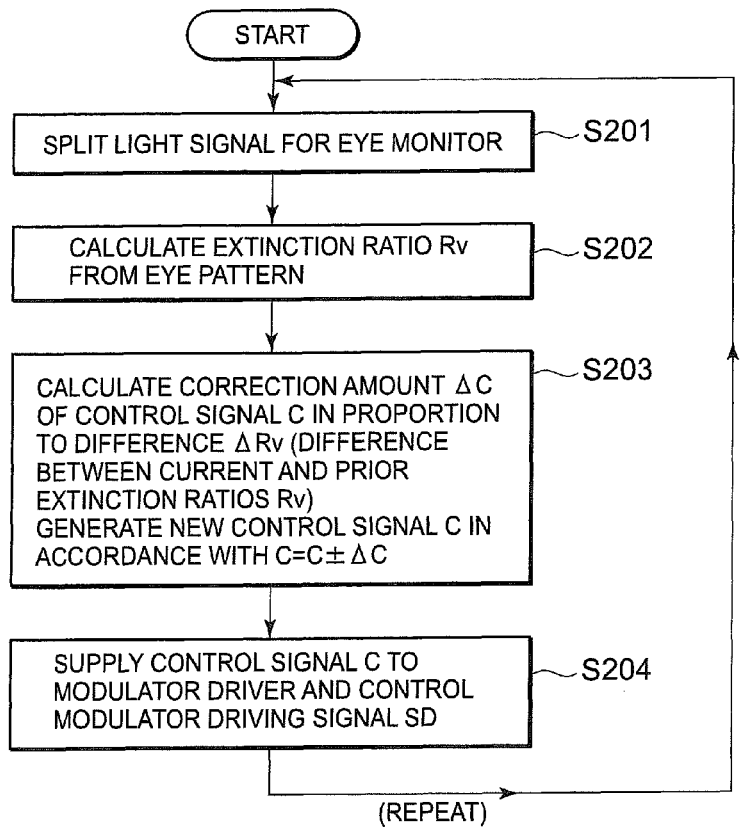
FIG. 6 is an explanatory diagram showing a control operation flow according to the second exemplary embodiment.
Figure 7:
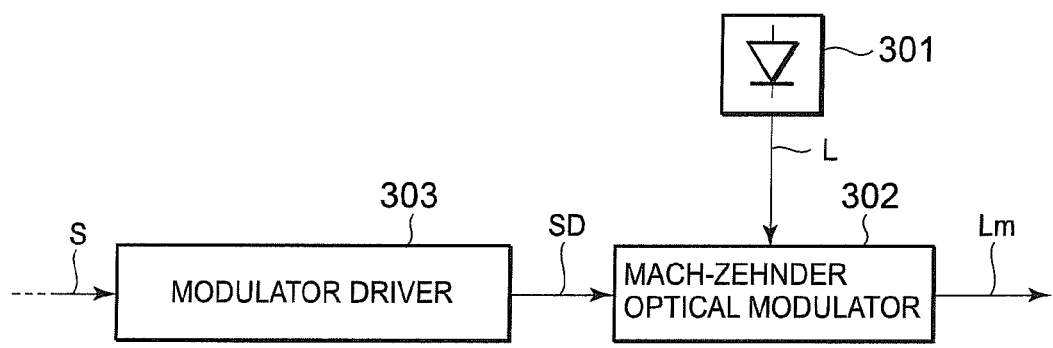
FIG. 7 is a block diagram showing an optical transmitter of a related art.
Figure 8A:
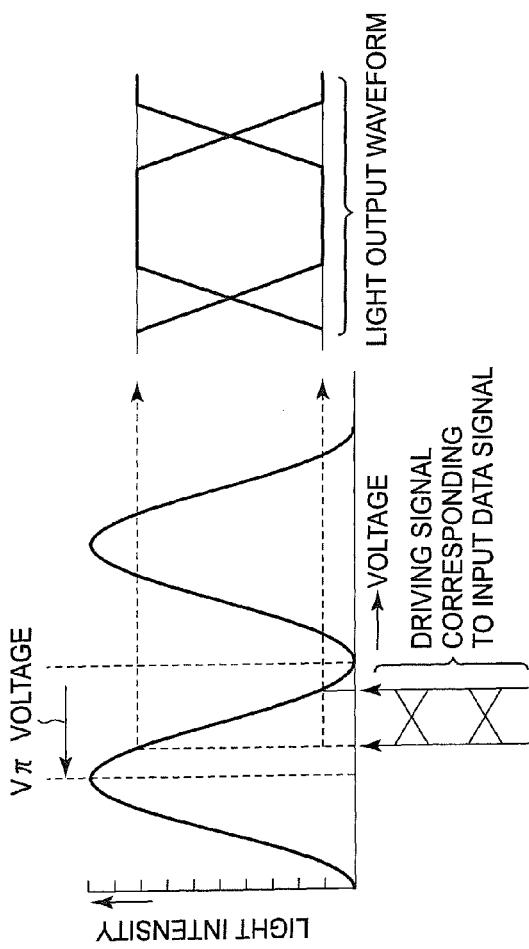
FIG. 8A is a diagram showing a modulation characteristic (a ratio between a driving voltage and a light output) of a Mach-Zehnder optical modulator and a driving voltage Vπ.
Figure 8B:
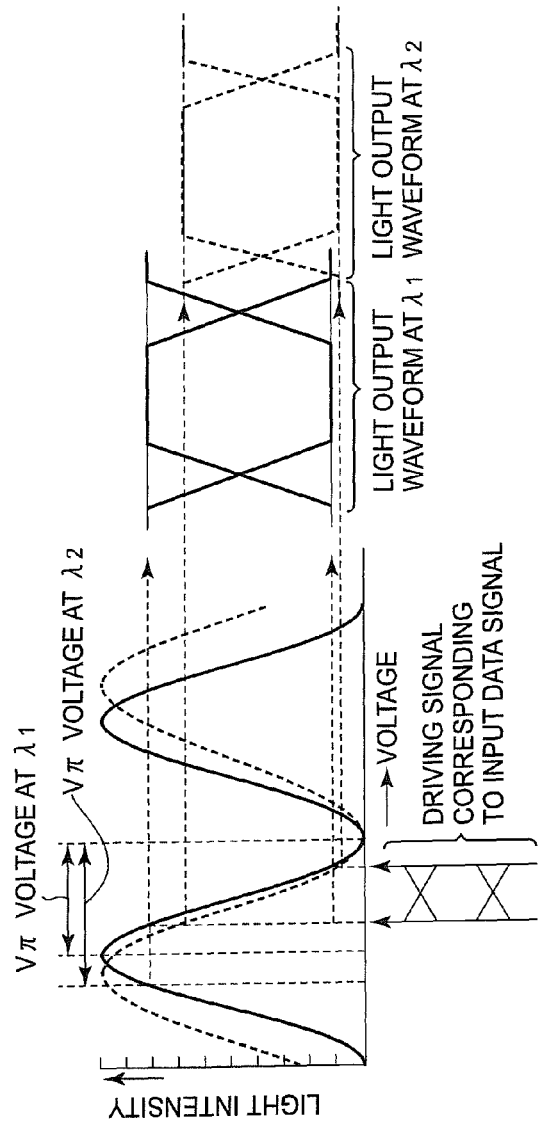
FIG. 8B is a diagram showing that the modulation characteristic of the Mach-Zehnder optical modulator changes with a change of a waveform.

Next, by referring to FIG. 6, description will be provided for the operational flow of "the control feedback" for generating the control signal C used to control the modulator driving signal SD of the modulator driver 3 in the second exemplary embodiment.

First, the optical coupler 6 splits the light signal Lm having the light intensity modulated into two signals, and transmits one of the signals to the transmission path. The other split signal is to be used as the light signal Lb for monitoring the modulation conditions, and is inputted into the eye monitor 7 that monitors the modulation conditions (step S201: a monitor light signal split step).

The eye monitor 7 converts the light signal Lb into the electric signal, and then calculates, from a so-called eye pattern, the extinction ratio Rv representing the modulation conditions (step S202: an extinction ratio calculation step).

Here, in addition to the extinction ratio Rv, a voltage of a cross point in the eye pattern, for example, may be included as an index representing the modulation conditions. The voltage of the cross point is used as an index of waveform distortion. In the second exemplary embodiment, however, a case of using the extinction ratio Rv is explained.

Note that, the eye pattern is formed by superimposing multiple ON/OFF pulse signals. For example, the extinction ratio is calculated by use of a ratio between the values of the ON and OFF signals around the center (having the largest noise margin) in the eye pattern. In order to calculate the extinction ratio, it is necessary to wait for at least both pulses of the ON and OFF signals until obtaining them. For this reason, a memory unit for storing these values is needed.

Then, the driving voltage controller 4 generates the control signal C according to the calculated extinction ratio Rv such that the modulation conditions can be optimum (step S203: a control signal generating step).

The control signal is generated as follows. First, the difference ΔRv between the current extinction ratio Rv and the prior extinction ratio Rv stored in the memory 1 is calculated, and the correction amount ΔC of the control signal C is determined according to the difference ΔRv. Thereafter, a new control signal C (=C±ΔC) is generated by adding the correction amount ΔC to the current control signal C.

Since the plus sign of the difference ΔRv between the extinction ratios indicates that the control signal is changing in the correct direction, the sign of the correction amount is kept the same as before. In contrast, since the minus sign of the difference ΔRv between the extinction ratios indicates that the control signal is changing in the wrong direction, the sign of the correction amount is inverted.

Here, the correction amount firstly calculated has no prior extinction ratio Rv for comparison. Accordingly, it is not possible to determine whether to increase or decrease the control signal by the correction amount. In this case, for example, a comparison may be made to find if the current modulator driving voltage is not less than the Vπ voltage. Instead, the modulation conditions of the light modulator may be changed by making control for increasing the voltage of the modulator driving signal SD only for the first time. Then, a new extinction ratio Rv is calculated after the change. After that, the new extinction ratio Rv is compared with the previous extinction ratio Rv. If the extinction ratio Rv is improved, this indicates that the direction of controlling the digital signal SD is correct, and thus the control in the same direction is continued.

If the extinction ratio Rv is declined, this indicates that the controlling direction is wrong. Accordingly, the control for inverting the direction of changing the voltage of the driving signal SD is performed from the second time. This process continues to be repeatedly executed until the extinction ratio is not improved any more. For this purpose, the driving voltage controller 4 includes the memory 1 for storing the extinction ratios Rv, and the memory 2 for storing the plus/minus of the correction amount of the control signal C.

Subsequently, the modulator driver 3 supplied with this control signal C takes control for adjusting the voltage of the modulator driving signal SD in a direction of improving the extinction ratio (step S204: a driving signal voltage control step).

By repeating the foregoing steps for control, the "control feedback" of this exemplary embodiment maintains the voltage of the modulator driving signal SD at the Vπ voltage corresponding to the current light wavelength λ.

Note that, although the second exemplary embodiment only uses the extinction ratio Rv as the modulation condition index Vm, the eye monitor 7 may also be configured to monitor a state of a cross point in the eye pattern. In the case of this configuration, the eye monitor 7 can measure a difference between the waveforms of ON and OFF signals, that is, a deviation of a cross point from an optimum point of the bias voltage of the Mach-Zehnder optical modulator 2. Accordingly, the eye monitor 7 is also capable of performing control for optimizing the bias voltage of the Mach-Zehnder optical modulator 2 by monitoring the state of the cross points in the eye pattern.

Moreover, the bias voltage is high when values around the cross point are concentrated at lower values. Accordingly, in this case, the eye monitor 7 transmits the bias voltage control signal such that the bias voltage can be decreased. In contrast, when the values around the cross point are concentrated at higher values, the bias voltage is low, and accordingly, the eye monitor 7 transmits the bias voltage control signal such that the bias voltage can be increased. In this way, the eye monitor 7 is capable of optimizing the bias voltage by controlling an unillustrated control circuit for the bias voltage.

One distinctive feature of the second exemplary embodiment is that a relation between light the wavelength and the optimum modulator driving signal does not have to be obtained in advance, because the modulator driving signal is controlled by monitoring the extinction ratio that represents the quality of an actual light signal. Moreover, the second exemplary embodiment produces an effect of allowing the light signal having the maximum extinction ratio to be always transmitted without causing an error in the setting even when the relation is changed due to various factors. Furthermore, another effect of enabling an optimum control for the bias voltage of the Mach-Zehnder optical modulator 2 is obtained by also monitoring the state of the cross point.

Here, the foregoing steps in the operations in the second exemplary embodiment executed by the above components may be executed by a computer. In this case, a program is created by regarding the execution contents of the steps as a monitor light signal splitting function, an extinction ratio calculating function, a control signal generating function and a driving signal voltage controlling function, and then the program thus generated is executed by the computer.

In this way, the processing having the same processing contents as the above steps can be executed by the computer, and thereby the same object as in the case of the optical transmission control method can be achieved efficiently.

3. Third Exemplary Embodiment

An optical transmitter according to a third exemplary embodiment has a configuration including a wavelength variable light source unit, a Mach-Zehnder optical modulator, a modulator driving unit, a wavelength information holder and a driving voltage controller. The Mach-Zehnder optical modulator modulates the light intensity of output light from the wavelength variable light source unit by use of a modulator driving signal. The modulator driving unit outputs the modulator driving signal according to an input data signal. The wavelength information holder holds wavelength information of output light from the wavelength variable light source unit. The driving voltage controller outputs a control signal to the modulator driving unit according to the wavelength information from the wavelength information holder.

With this configuration, the voltage of the modulator driving signal is controlled and adjusted to the optimum driving voltage according to the light wavelength by use of the control signal from the driving voltage controller. This makes it possible to check a deterioration of a light transmission waveform, which deterioration is caused by the difference between output wavelengths.

4. Fourth Exemplary Embodiment

According to a forth exemplary embodiment, the wavelength information holder in the optical transmitter of the third exemplary embodiment is configured of a WDM transmitter that monitors and controls the whole system.

In this configuration, the control and monitoring device provided in the transmitter is used as the wavelength information holder. Thus, the fourth exemplary embodiment produces a benefit of eliminating the necessity of newly installing an apparatus for holding or obtaining wavelength information.

5. Fifth Exemplary Embodiment

An optical transmitter according to a fifth exemplary embodiment has a configuration including a wavelength variable light source unit, a Mach-Zehnder optical modulator, a modulator driving unit, an optical coupler, an eye monitor and a driving voltage controller. The Mach-Zehnder optical modulator modulates the light intensity of output light from the wavelength variable light source unit by use of a modulator driving signal. The modulator driving unit outputs the modulator driving signal according to an input data signal. The optical coupler splits the modulated light from the Mach-Zehnder optical modulator. The eye monitor calculates the extinction ratio of the split modulated light. The driving voltage controller outputs the control signal to the modulator driving unit according to the calculated extinction ratio.

With this configuration, the voltage of the modulator driving signal is controlled and adjusted to the optimum driving voltage according to the light wavelength by use of the control signal from the driving voltage controller. This makes it possible to check a deterioration of a light transmission waveform, which deterioration is caused by the difference between output wavelengths. Moreover, the control is performed by monitoring the extinction ration of an actual light signal. This brings effects that a relation between light the wavelength and the optimum modulator driving signal does not have to be obtained in advance, and that the light signal having the maximum extinction ratio is always transmitted without an error occurring in the setting even when the relation is changed due to various factors.

6. Sixth Exemplary Embodiment

In a sixth embodiment, the optical transmitter of the fifth exemplary embodiment has a configuration in which the eye monitor includes: a light receiver that converts the modulated light into an electric signal; a clock reproducer that reproduces a clock signal from the electric signal; an A/D converter that converts the electric signal into a digital signal according to the clock signal; and an extinction ratio calculator that calculates the extinction ratio according to the digital signal.

7. Seventh Exemplary Embodiment

An optical transmission control method according to a seventh exemplary embodiment is implemented by a modulator driving unit that outputs a modulator driving signal according to an input data signal; a wavelength variable light source unit that emits light; and a Mach-Zehnder optical modulator that receives light from the wavelength variable light source unit and modulates the light intensity of the received light by use of a modulator driving signal from the modulator driving unit. The optical transmission control method includes a wavelength information obtaining step, a control signal generation step and a driving signal voltage controlling step. In the wavelength information obtaining step, wavelength information of the wavelength variable light source unit is obtained. Then, in the control signal generation step, a control signal for controlling the modulator driving unit is generated by use of a modulation characteristic of the Mach-Zehnder optical modulator and a control characteristic of the modulator driving unit. Here, these modulation and control characteristics are obtained in advance according to the obtained wavelength information. Thereafter, in the driving signal voltage controlling step, the voltage of the modulator driving signal is controlled according to the control signal.

With this method, the voltage of the modulator driving signal is controlled and adjusted to the optimum driving voltage according to the light wavelength by use of the control signal from the driving voltage controller. This makes it possible to check a deterioration of a light transmission waveform, which deterioration is caused by the difference between output wavelengths.

8. Eighth Exemplary Embodiment

An optical transmission control method according to an eighth exemplary embodiment is implemented by a modulator driving unit that outputs a modulator driving signal according to an input data signal; and a wavelength variable light source unit that emits light; and a Mach-Zehnder optical modulator that receives light from the wavelength variable light source unit, and modulates the light intensity of the received light by use of a modulator driving signal from the modulator driving unit. The optical transmission control method includes: a monitor light signal splitting step of generating a light signal for modulation condition monitoring by splitting a light signal, and inputting the light signal into the eye monitor; an extinction ratio calculation step of calculating, from an eye pattern, the extinction ratio representing the modulation conditions; a control signal generating step of generating a control signal according to this extinction ratio such that the modulation conditions can be optimum; and a driving signal voltage controlling step of controlling the voltage of the modulator driving signal according to the control signal.

With this method, the voltage of the modulator driving signal is controlled and adjusted to the optimum driving voltage according to the light wavelength. This makes it possible to check a deterioration of a light transmission waveform, which deterioration is caused by the difference between output wavelengths. Moreover, the control is performed by monitoring the extinction ration of an actual light signal. This brings effects that a relation between light the wavelength and the optimum modulator driving signal does not have to be obtained in advance, and that the light signal having the maximum extinction ratio is always transmitted without an error occurring in the setting even when the relation is changed due to various factors.

9. Ninth Exemplary Embodiment

A light transmission control program according to a ninth exemplary embodiment causes a computer to execute: a wavelength information obtaining function of obtaining wavelength information of a wavelength variable light source unit; a control signal generating function of generating a control signal for controlling a modulator driving unit; and a driving signal voltage controlling function of controlling the voltage of the modulator driving signal according to the control signal. Here, the control signal is generated by use of the modulation characteristic of the Mach-Zehnder optical modulator and the control characteristic of the modulator driving unit, and these modulation and control characteristic are obtained in advance according to the obtained wavelength information.

10. Tenth Exemplary Embodiment

A light transmission control program according to a tenth exemplary embodiment allows a computer to execute: a monitor light signal splitting function of generating a light signal for modulation condition monitoring by splitting a light signal, and inputting the light signal into an eye monitor; an extinction ratio calculation function of calculating, from an eye pattern, the extinction ratio representing the modulation conditions; a control signal generating function of generating a control signal according to this extinction ratio such that the modulation conditions can be optimum; and a driving signal voltage controlling function of controlling the voltage of the modulator driving signal according to the control signal.

As has been described above, the voltage of the modulator driving signal is controlled and adjusted to the optimum driving voltage according to the light wavelength. This makes it possible to check a deterioration of a light transmission waveform, which deterioration is caused by the difference between output wavelengths.

In addition to this, when the control is taken by performing feedbacks of light signals and by monitoring the quality of the light signals, it is possible to always transmit the optimum light signal without being influenced by an error in the settings.

The previous description of these embodiments is provided to enable a person skilled in the art to make and use the present invention. Moreover, various modifications to the embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. An optical transmitter that transmits a light signal, comprising:
    a light source,
    a Mach-Zehnder optical modulator,
    a modulator driver,
    an optical coupler,
    an eye monitor, and
    a driving voltage controller, wherein
    the Mach-Zehnder optical modulator modulates the light intensity of output light from the light source by use of a modulator driving signal,
    the modulator driver outputs the modulator driving signal according to an input data signal,
    the optical coupler splits modulated light from the Mach-Zehnder optical modulator,
    the eye monitor calculates the extinction ratio of the modulated light, and
    the driving voltage controller outputs, to the modulator driver, a control signal for setting the latest driving voltage, according to the calculated extinction ratio,
    wherein the eye monitor comprises:
        a light receiver that converts the modulated light into an electric signal;
        a clock reproducer that reproduces a clock signal from the electric signal;
        an analog-digital converter that converts the electric signal into a digital signal according to the clock signal; and
        an extinction ratio calculator that calculates the extinction ratio according to the digital signal.

2. The optical transmitter according to claims 1, wherein the light source is a wavelength variable light source.

3. A light signal transmission method, comprising the steps of:
    splitting a light signal that has passed through a modulator;
    calculating, by an eye monitor, an extinction ratio from an eye pattern of the light signal, the extinction ratio representing a modulation condition;
    generating a control signal according to the extinction ratio such that the modulation
    condition can be optimum;
    controlling a voltage of a modulator driving signal according to the control signal;
    outputting the modulator driving signal according to an input data signal; and
    modulating the light intensity of light from a light source by use of the modulator driving signal,
    wherein the eye monitor comprises:
        a light receiver that converts the modulated light into an electric signal;
        a clock reproducer that reproduces a clock signal from the electric signal;
        an analog-digital converter that converts the electric signal into a digital signal according to the clock signal; and
        an extinction ratio calculator that calculates the extinction ratio according to the digital signal.

* * * * *